United States Patent
Edwards et al.

(10) Patent No.: US 6,749,921 B1
(45) Date of Patent: Jun. 15, 2004

(54) FIBER-REINFORCED THERMOPLASTIC COMPOSITE BONDED TO WOOD

(75) Inventors: Christopher M. Edwards, Midland, MI (US); Faye J. Miller, Plymouth, MI (US); Edward L. d'Hooghe, Hulst (NL)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/449,204

(22) Filed: May 30, 2003

Related U.S. Application Data

(62) Division of application No. 09/876,633, filed on Jun. 7, 2001, now Pat. No. 6,592,962.
(60) Provisional application No. 60/233,879, filed on Sep. 20, 2000, and provisional application No. 60/210,566, filed on Jun. 9, 2000.

(51) Int. Cl.[7] .................................................. B32B 3/00
(52) U.S. Cl. ....................... 428/114; 428/394; 428/535; 428/537.1
(58) Field of Search ................... 428/114, 535, 428/537.1, 394; 52/730.7, 729.4

(56) References Cited

U.S. PATENT DOCUMENTS

| | | |
|---|---|---|
| 4,376,834 A | 3/1983 | Goldwasser et al. |
| 4,503,115 A | 3/1985 | Hemels et al. |
| 4,615,163 A * | 10/1986 | Curtis et al. ............... 52/737.3 |
| 5,026,593 A | 6/1991 | O'Brien |
| 5,362,545 A | 11/1994 | Tingley |
| 5,456,781 A | 10/1995 | Tingley |
| 5,498,460 A | 3/1996 | Tingley |
| 5,547,729 A | 8/1996 | Tingley |
| 5,565,257 A | 10/1996 | Tingley |
| 5,627,254 A | 5/1997 | Oriani |
| 5,641,553 A | 6/1997 | Tingley |
| 5,648,138 A | 7/1997 | Tingley |
| 5,885,685 A | 3/1999 | Tingley |
| 5,891,550 A | 4/1999 | Tingley |
| 5,891,560 A | 4/1999 | Edwards et al. |
| 5,910,352 A | 6/1999 | Tingley |
| 5,974,760 A | 11/1999 | Tingley |
| 6,037,049 A | 3/2000 | Tingley |
| 6,173,550 B1 | 1/2001 | Tingley |

* cited by examiner

*Primary Examiner*—Alexander S. Thomas

(57) ABSTRACT

The present invention relates to wood that is reinforced with a fiber-reinforced thermoplastic composite that contains a plurality of substantially parallel continuous fibers impregnated with thermoplastic polymer having the following structural units:

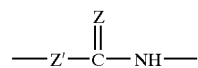

where Z is S or O, and Z' is S, O, N-alkyl or NH The invention is useful in a variety of applications including glue-laminated structures, laminated veneer lumber, reinforced I-beams, parallel strand lumber, reinforced particle board, and ladders. The use of a thermoplastic polyurethane, particularly the high Tg thermoplastic polyurethane as the impregnating resin provides a means of recycling and reusing the reinforced lumber, as well as shaping the composite in ways that would be impossible using conventional fibe-reinforced thermoset composites.

11 Claims, 4 Drawing Sheets

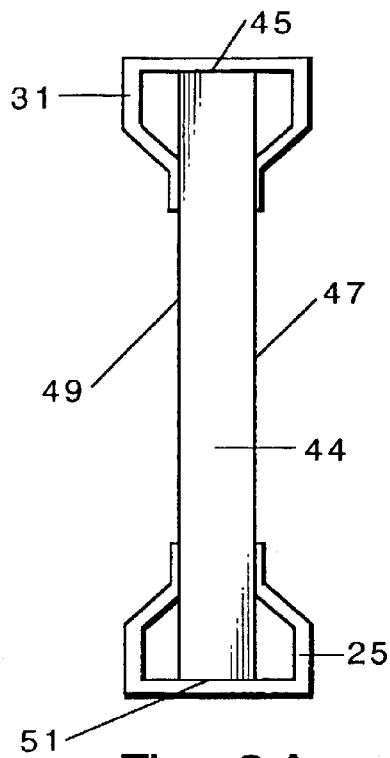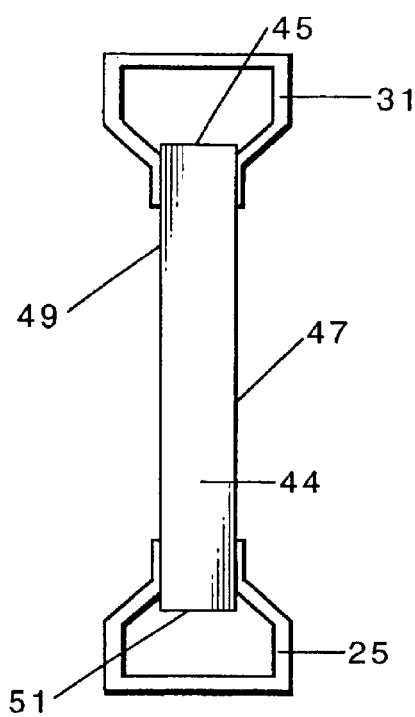
Fig. 3A    Fig. 3B
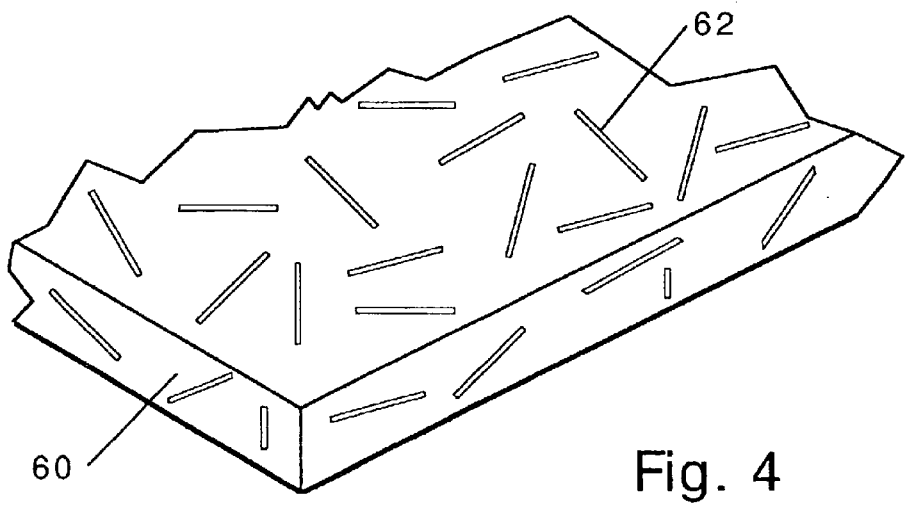
Fig. 4

FIBER-REINFORCED THERMOPLASTIC COMPOSITE BONDED TO WOOD

CROSS-REFERENCE STATEMENT

This application is a divisional of and claims the benefit of U.S. Utility application Ser. No. 09/876,633, filed Jun. 7, 2001 (now issued as U.S. Pat. No. 6,592,962), and further claims the benefit of U.S. Provisional Application No. 60/233,879, filed Sep. 20, 2000 and U.S. Provisional Application No. 60/210566, filed Jun. 9, 2000.

BACKGROUND OF THE INVENTION

The present invention relates to wood that is reinforced with a fiber-reinforced thermoplastic composite.

As a result of dwindling stocks of high quality lumber, wood product engineers have had to adopt innovative designs to enhance the structural properties and reduce the cost of wood products. Examples of these designs include glue laminated wood beams, laminated veneer lumber, parallel strand lumber laminated wood columns, wood I-beams, and wood trusses. However, merely redesigning the lumber products has not proved adequate. Therefore, efforts have continued to combine low quality, low cost lumber with structurally reinforcing composites to achieve the same performance as achieved with higher cost, higher quality wood products.

For example, O'Brien in U.S. Pat. No. 5,026,593 discloses the use of a thin flat aluminum strip to reinforce a laminated beam. O'Brien teaches that the aluminum strip must be continuous across the width and length of the beam and that the reinforcing strip may be affixed to the lowermost lamina to improve tensile strength or to the uppermost lamina to improve compression strength of the beam.

In U.S. Pat. No. 5,362,545, Tingley (hereinafter "Tingley '545") discloses the use of reinforced plastics in glue laminated wood beams (glulams). More particularly, Tingley '545 discloses the use of pultruded composites as materials. These composites are prepared by impregnating thermoset or thermoplastic resins into a continuous fiber bundle. The disclosed thermoset resins include epoxy resins, polyesters, vinyl esters, phenolic resins, polyimides, and polystyrylpyridine while the thermoplastic resins include polyethylene terephthalate and nylon-66. The preferred fibers are disclosed as being aramid or carbon fibers or high modulus polyethylene fibers. Tingley '545 discloses that it is necessary to "hair up" the surface of the fiber-reinforced composite so that fibers protrude, thereby providing a means of adhering the wood to the composite without having to use expensive epoxy adhesives.

In U.S. Pat. No. 5,498,460, Tingley discloses improved adhesion of the fiber-reinforced composite to the wood by creating multiple recesses distributed over the opposed major surfaces of the composite.

In U.S. Pat. No. 5,547,729, Tingley discloses abraded or haired up synthetic tension and compression reinforcements to provide enhanced tensile and compression strength.

In U.S. Pat. No. 5,641,553, Tingley discloses a reinforcing panel comprising a plurality of substantially continuous and parallel synthetic fibers, affixed to at least one cellulose surface material, which improves adhesion of the panel to a wood structure.

In U.S. Pat. No. 5,885,685, Tingley discloses an aramid fiber mat encased in resin along with the fiber-reinforced composite to reduce interlaminar shear failure when nonepoxy resins are used for encasement.

In U.S. Pat. No. 6,037,049, Tingley discloses a composite that comprises two types of fiber strands encased in a resin matrix, a high strength fiber for the central portion of the composite and a lower strength fiber for the edges. The use of lower cost fibers along the edges reduces waste during a planing process.

In each instance, the prior art requires some kind of modification to the surface of the composite to enhance adhesion to the wood member. It would therefore be desirable to prepare a glue-laminated wood structural member that is reinforced with a composite that adhered to wood either with reduced or no adhesive and without surface modification of the composite.

SUMMARY OF THE INVENTION

The present invention addresses a problem in the art by providing a reinforced wood structure comprising an a) elongated multilamellar wood member having an uppermost lamina with an outer surface, a lowermost lamina with an outer surface, a longitudinal center, and a transverse center; and b) a first elongated fiber-reinforced thermoplastic composite layer disposed 1) through the longitudinal center of the wood member; and 2) between and adherent to the major surfaces of two of the laminae, or adherent to the outer surface of the uppermost or the lowermost lamina; wherein the composite contains a plurality of substantially parallel continuous fibers impregnated with a thermoplastic polymer having the following structural units:

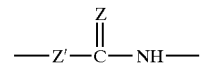

where Z is S or O, and Z' is S, O, N-alkyl or NH.

In a second aspect, the present invention is a reinforced wood structure comprising a) an elongated multilamellar wood member having an uppermost lamina with an outer surface, a lamina adjacent to the uppermost lamina, a lowermost lamina with an outer surface, and a lamina adjacent to the lowermost lamina; b) a first elongated fiber-reinforced thermoplastic composite layer disposed through the length of the wood member and between and adherent to the uppermost lamina and the lamina adjacent to the uppermost lamina; c) a second elongated fiber-reinforced thermoplastic composite layer disposed through the longitudinal center of the wood member and between and adherent to the lowermost lamina and the lamina adjacent to the lowermost lamina, wherein the composite layers each contain a plurality of substantially parallel continuous fibers impregnated with a thermoplastic polyurethane.

In a third aspect, the present invention is a reinforced wood structure comprising a fiber reinforced thermoplastic composite layer disposed onto wood or dispersed into wood particles, wherein the thermoplastic composite layer contains a plurality of substantially parallel continuous fibers impregnated with a thermoplastic polymer having; the following structural units:

where Z is S or O, and Z' is S, O, N-alkyl or NH.

In a fourth aspect, the present invention is a reinforced wood structure comprising a first fiber-reinforced thermoplastic composite flange and a second fiber-reinforced thermoplastic composite flange, each flange being bonded to a web to form a reinforced I-beam, wherein the fiber-reinforced thermoplastic composite flanges contain a plurality of substantially parallel continuous fibers impregnated with a thermoplastic polymer having the following structural units:

where Z is S or O, and Z' is S, O, N-alkyl or NH.

In a fifth aspect, the present invention is a reinforced wood structure comprising an elongated multilamellar wood member having a longitudinal center, a transverse center, a width center, and a plurality of elongated fiber-reinforced thermoplastic composite rods, at least two of which rods are tension reinforcement rods and at least two of which rods are compression reinforcement rods, wherein the tension reinforcement rods are disposed through the longitudinal center, and distal on either side of the width center and imbedded into and adhering to a lamina distal from the transverse center and proximal to the lowermost lamina of the multilamellar structure, and wherein the compression reinforcement rods are disposed through the longitudinal center, and distal from either side of the width center and imbedded into and adhering to a lamina distal from the transverse center and proximal to the uppermost lamina of the multilamellar structure.

In a sixth aspect, the present invention is a reinforced wood structure comprising a wood member having slots or bores and a plurality of elongated fiber-reinforced thermoplastic composite rods incorporated into the slots or bores of the wood member.

BRIEF DESCRIPTION OF THE DRAWINGS

FIG. 3 is an illustration of an I-beam reinforced with purely synthetically reinforced flanges.

FIG. 4 is an illustration of particle board reinforced with strands of synthetic reinforcement.

DETAILED DESCRIPTION OF THE INVENTION

Figure 1A:
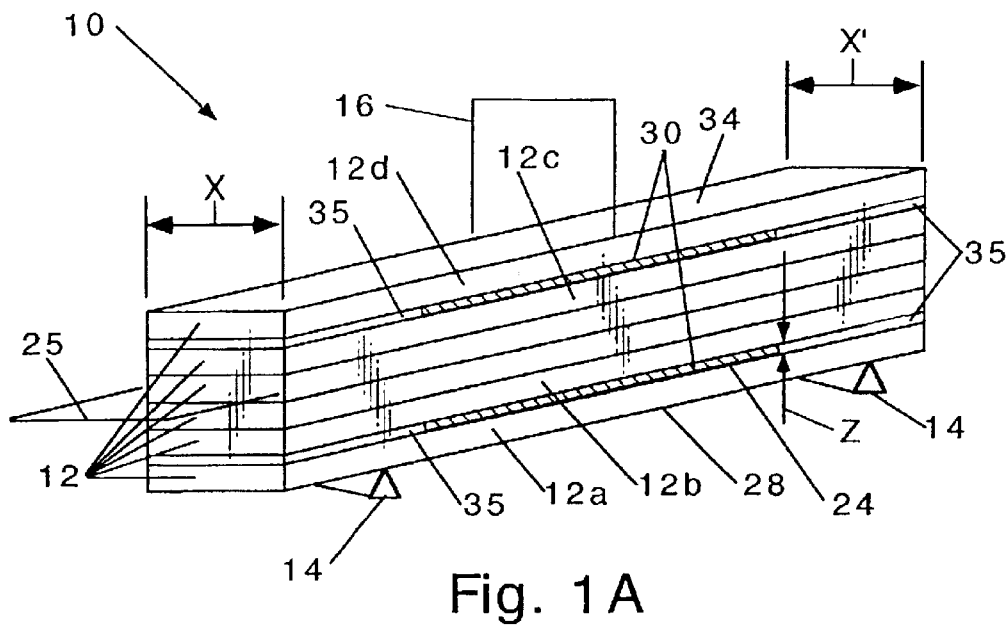
FIG. 1a is an illustration of a reinforced glue-laminated or laminated veneer lumber structure.

In a preferred embodiment of the present invention, FIG. 1a shows an elongated glue laminated wood structural member 10 having multiple wood laminae 12 that are bonded together as elongated boards. The wood structural member 10 is shown with its ends supported by a pair of blocks 14 and bearing a point load 16 midway between the blocks 14. It will be appreciated that the glue laminated wood member 10 could also bear loads distributed in other ways (for example, cantilevered) or be used as a truss, joist, or column. It will also be appreciated that the wood member 10 can be in the form of laminated veneer lumber (LVL).

Under the conditions represented in FIG. 1a, the lowermost lamina 12a is subjected to a substantially pure tensile stress and the uppermost lamina 12d is subjected to a substantially pure compressive stress. To increase the tensile load-bearing capacity of the glue laminated wood member 10, at least one layer of synthetic tension reinforcement 24 is offset from the transverse center 25 and adhered between lamina proximal to the lowermost lamina 12a, preferably between the lowermost lamina 12a and the adjacent lamina 12b. Alternatively, the synthetic tension reinforcement 24 may be adhered to the outer surface 28 of the lowermost lamina 12a.

To increase the compressive load-bearing capacity of the glue laminated wood member 10, at least one layer of synthetic compression reinforcement 30 is distal from the transverse center 25 and adhered between lamina proximal to the uppermost lamina 12d, preferably between the uppermost lamina 12d and the adjacent lamina 12c. Alternatively, the synthetic compression reinforcement 30 may be adhered to the outer surface 34 of the uppermost lamina 12d.

Synthetic tension reinforcement 24 and synthetic compression reinforcement 30 are generally positioned through the longitudinal center 16 and preferably extend along from about 20% to about 100% of the length of the wood structural member 10. If the length of the synthetic tension reinforcement 24 is less than the length of the wood structural member, a pair of spacers 35, preferably wood spacers, are advantageously positioned at opposite ends of synthetic tension reinforcement 24 between laminae 12a and 12b to maintain a uniform separation therebetween. Similarly, a pair of spacers 35 are advantageously positioned at opposite ends of synthetic compression reinforcement 30 between laminae 12c and 12d to maintain a uniform separation therebetween.

The widths x of the synthetic reinforcements 24 and 30 are preferably matched to the finished width x' of wood member 10 by methods such as those described in U.S. Pat. No. 5,456,781, column 4, lines 8–35, which teachings are incorporated herein by reference. The thicknesses z of the reinforcements 24 and 30 are application dependent but are preferably in the range of from about 0.01 cm, more preferably from about 0.1 cm, to preferably about 1 cm, more preferably to about 0.5 cm.

Figure 1B:
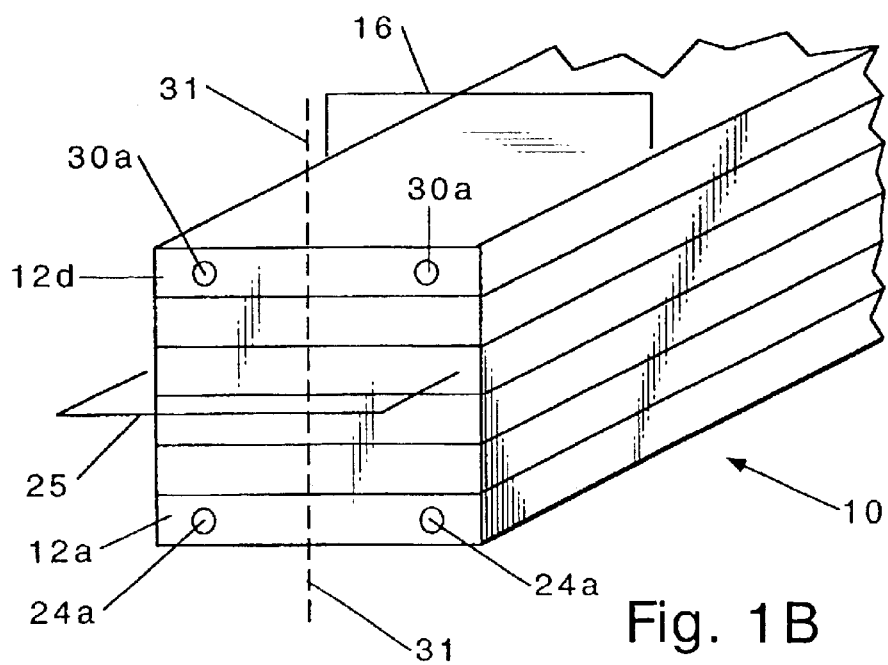
FIG. 1b is an illustration of a glue-laminated or laminated veneer lumber structure that is reinforced with a plurality of composite rods.

FIG. 1b illustrates a modification of the embodiment illustrated in FIG. 1a, wherein the multi-lamellar structure 10 is reinforced with a plurality of synthetic reinforcement rods incorporated into two of the lamina of the multi-lamellar structure 10 and along the grain of the structure 10. Although FIG. 1b illustrates a composite with two synthetic tension reinforcement rods 24a, and two synthetic compression reinforcement rods 30a, it is possible, and may be desirable, to incorporate a multitude of synthetic tension and compression reinforcement rods into the composite. Synthetic reinforcing sheets can be used in place of or in addition to reinforcing rods and the synthetic reinforcement rods (24a, 30a) may be mechanically or adhesively bonded or mechanically and adhesively bonded to the lamellae.

The synthetic tension reinforcement rods 24a are disposed through the longitudinal center 16 of the structure and may, but do not necessarily, extend through the length of the structure 10. The rods 24a are distal from either side of the width center 31 and embedded into and bonded to a lamina distal from the transverse center and proximal to the lowermost lamina 12a, preferably imbedded into and bonded to the lowermost lamina 12a, which may be slotted or bored to accommodate to the tension reinforcement rods 24a.

Figure 1C:
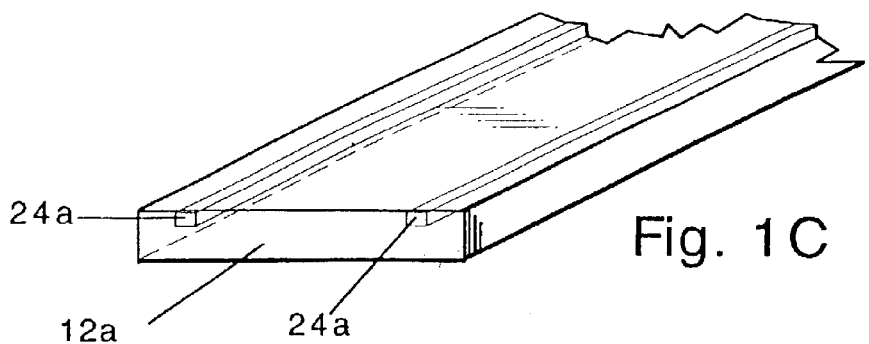
FIG. 1c is an illustration of reinforcing composite rods disposed in the slots of a slotted lamina.
Figure 1D:
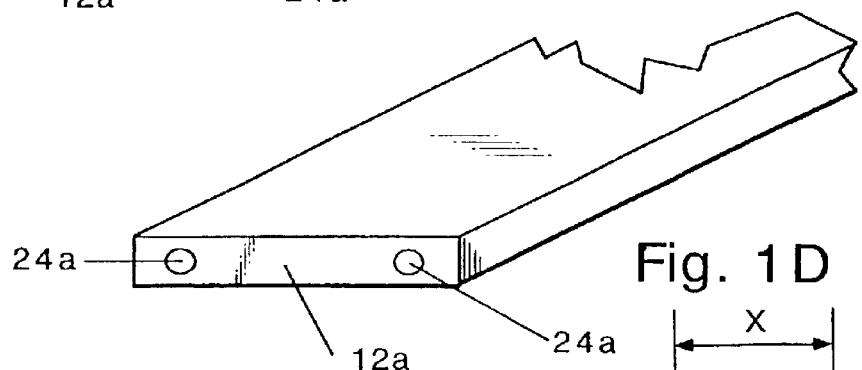
FIG. 1d is an illustration of reinforcing composite rods disposed in the bores of a bored lamina.

Similarly the two synthetic compression reinforcement rods 30a are disposed through the longitudinal center 16 of the structure 10, and may extend through the length of the structure 10. The rods 30a are distal from either side of the width center 31 and imbedded into and bonded to a lamina distal from the transverse center 25 and proximal to the uppermost lamina 12d, preferably imbedded into and bonded to the uppermost lamina 12d, which may be slotted or bored to accommodate to the compression reinforcement rods 30a. FIG. 1c illustrates a portion of an individual slotted lamina 12a with the rods 24a disposed in the slots. FIG. 1d illustrates a portion of an individual bored lamina 12a with the rods 24a disposed in the bores.

The reinforced multilamellar structure represented by FIG. 1b is especially advantageous for applications requiring repairing or reinforcing existing structures such as bridges and utility poles, or upgrading beams in houses, because of the ease of incorporating the rods into these structures. Other structures suitable for reinforcement using this embodiment include home and office furniture such as bookshelves, kitchen cabinet shelves, work surfaces, and desks. To simplify manufacture of structures such as glulam beams, a separate lamstock consisting of only the layer of a glulam containing reinforcement, or a lamstock consisting of a layer of LVL containing reinforcement can be made and supplied separately.

The composite rods can have any desirable cross-sectional shape such as circular, oval, rectangular, and star-shaped, and the rods may be hollow, C-shaped, Z-shaped, and the like. The rods are desirably incorporated through the longitudinal center of the multilamellar structure, and preferably along the entire length of the structure.

Figure 2:
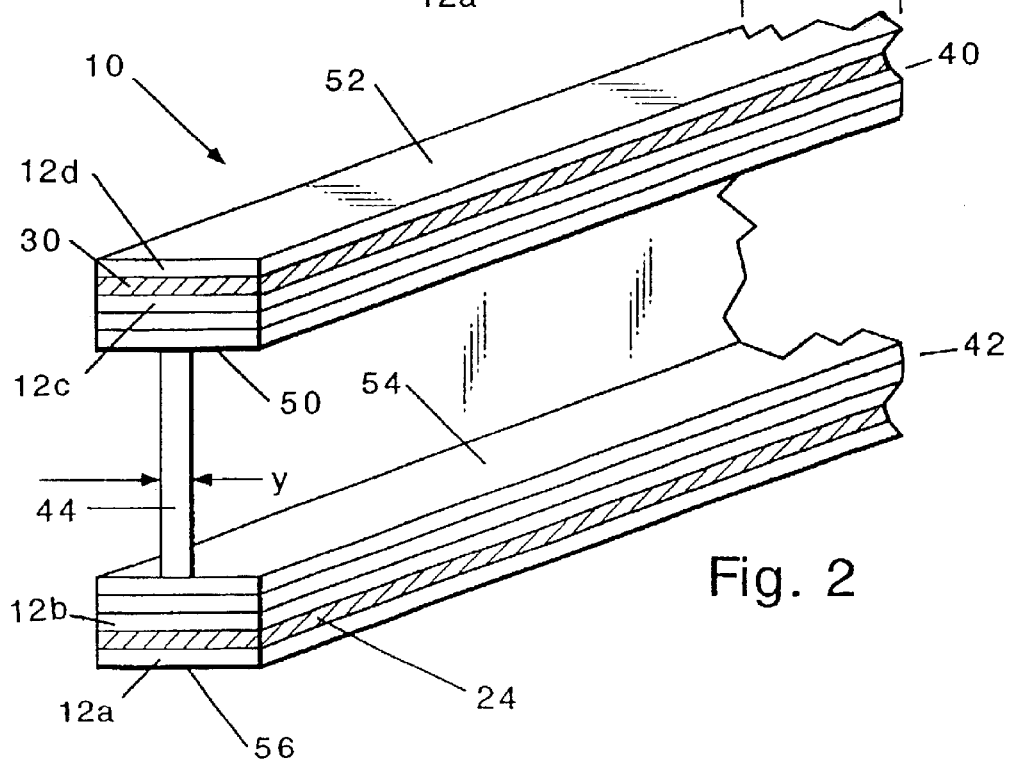
FIG. 2 is an illustration of a reinforced I-beam.

Another example of a use for the reinforced wood structures illustrated in FIGS. 1 and 2 is wood ladders containing linear veneer lumber rails that are reinforced with composite rods or sheets.

FIG. 2 represents another embodiment of the reinforced wood structure 10 of the present invention which is generally in the shape of an I-beam. The embodiment depicts a compression reinforcement portion 40 (also known as a compression flange) at the top of the wood structure 10 and a tension reinforcement portion 42 (also know as a tension flange) at the bottom of the wood structure 10. The compression flange 40 comprises a synthetic compression reinforcement 30 bonded between the uppermost lamina 12d and the adjacent Laconia 12c. The tension reinforcement flange 42 comprises the synthetic tension reinforcement 24 bonded between the lowermost lamina 12a and the adjacent lamina 12b. A web 44 is centrally disposed between the reinforcement flanges 40 and 42 at their major surfaces 50 and 54 to form the "I" beam shape. The web 44, which can be any suitable material, but is preferably made of oriented strand board or plywood. The web 44 has substantially the same length as the laminae 12a, 12b, 12c, and 12d, but is narrower in width. The ratio of the width x of the reinforcement flanges 40 and 42 to the width y of the aligned web 44 is application dependent but generally varies from about 4:1 to about 10:1. It is to be understood that the reinforcement flanges 40 and 42 may contain several wood laminae. In this case, the synthetic reinforcements 24 and 30 can be bonded between any two laminae. Alternatively, the synthetic reinforcements can be bonded to a major surface 50, 52, 54, or 56 of the reinforcement flanges 40 and 42. In this case, the reinforcement portions may contain a single lamina or multiple laminae.

Reinforcement of wood can also be accomplished by shaping the synthetic reinforcements in the form of flanges to adhere to the web without wood laminae. FIG. 3 illustrates such a reinforcement. In FIG. 3A a synthetic compression reinforcement flange 31 is depicted as adhering to the top 45 and major surfaces 47 and 49 of the aligned web 44 while a synthetic tension reinforcement flange 25 is depicted as adhering to the bottom 51 and the major surfaces 47 and 49 of the web 44. Alternatively, as illustrated, in FIG. 3B, the tension reinforcement flange 25 can be adhered to the major surfaces 47 and 49 of web 44 without being adhered to the bottom 51, while the compression reinforcement flange 31 can be adhered to the major surfaces 47 and 49 of the web 44 without being adhered to the top.

Synthetic reinforcement can also be used to improve the physical properties of adherent wood particles such as particle board, oriented strand board, oriented strand lumber, fiberboard, and chipboard. As illustrated in FIG. 4, particle board 60 is reinforced with strands of synthetic reinforcement 62 dispersed in an aligned or random fashion in the particle board 60. The dimensions of the synthetic reinforcement strands 62 can vary widely, but are typically in the order of 0.01 cm×01 cm×1 cm to about 0.1×0.5×10 cm. Because of the unique properties of the synthetic reinforcement material, discussed herein, this reinforced particle board is recyclable and reusable. Indeed, the reinforced structural lumber illustrated in FIGS. 1–3 can all be recycled to make reinforced particle board 60. To our knowledge, no other synthetic reinforcement is suitable for this purpose.

Figure 5:
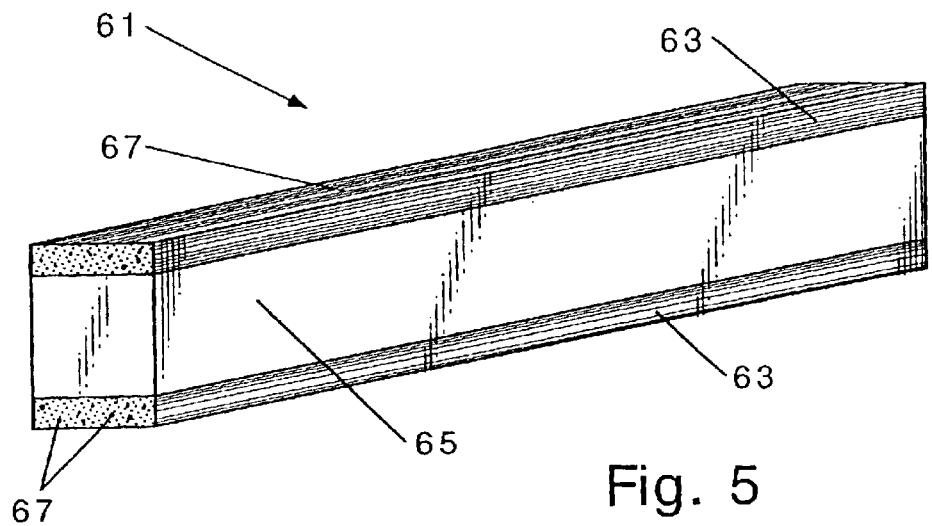
FIG. 5 is an illustration of a wood particle structure reinforced with sheets of synthetic reinforcement.

FIG. 5 illustrates another embodiment of the present invention. In this embodiment, a reinforced wood particle structure 61 can be made by superposing sheets of synthetic reinforcement 63 onto one major surface of elongated particle board beam 65 and preferably opposing major surfaces of elongated particle board beam 65. The reinforcing fibers 67 are longitudinally aligned and extend continuously through the length of the reinforced wood particle structure 61. This reinforced wood particle structure 61, which is similar in strength and stiffness to LVL or solid lumber, can be manufactured in a single stage because the adhesive used to bind the particles together to make the particle board (typically MDI) can also adhere the composite to the particle board as it is being manufactured. The reinforced wood particle structure 61 can also be in the shape of a panel, or an I-beam, wherein the synthetic reinforcement superposes outer major surfaces of flanges made from particle board.

In another embodiment of the present invention, strands of the synthetic reinforcement material can be incorporated into parallel strand lumber (PSL) in which strands of lumber are aligned along an axis. In this embodiment, the synthetic reinforcement material is aligned along the same axis as the lumber strands and dispersed through the PSL structure.

Figure 6:
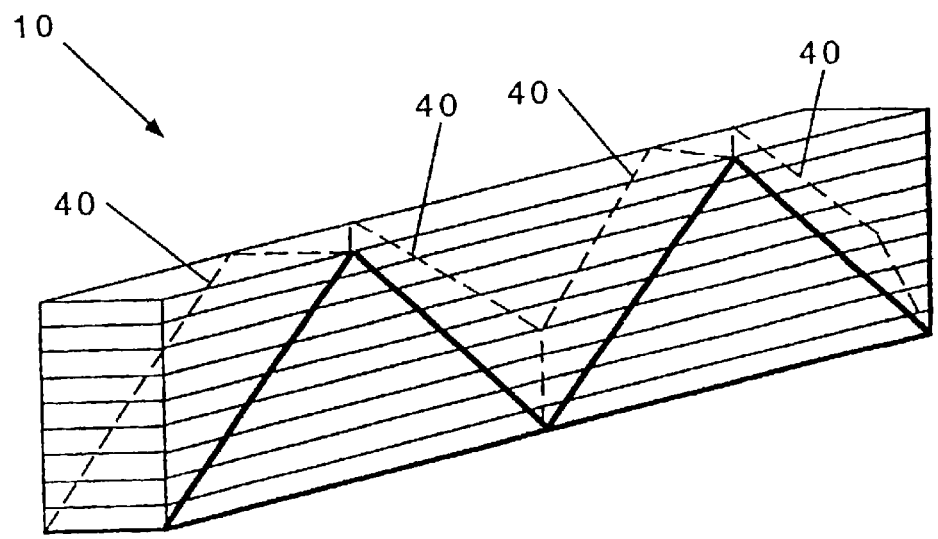
FIG. 6 is an illustration of a glum lam reinforced with sheets of synthetic reinforcement in a zig zag pattern.

FIG. 6 illustrates another embodiment of the invention. In this embodiment, sheets of the synthetic reinforcement 40 are incorporated in a zig-zag fashion across the grain of the multilamellar structure 10. The sheets can be inserted into an appropriately slotted structure.

The preferred synthetic reinforcements and flanges depicted in FIGS. 1–6 are fiber-reinforced thermoplastic composites described by Edwards et al. in U.S. Pat. No. 5,891,560, column 3, lines 8–37 to column 4, lines 1–35, which description is incorporated herein by reference. The preferred fiber-reinforced composite comprises a depolymerizable and repolymerizable thermoplastic polymer resin, and at least 30 percent, more preferably at least 50 percent, and most preferably at least 65 percent by volume of substantially parallel reinforcing fibers that are impregnated by the polymer resin and extend substantially through the length of the resin. The composite is preferably prepared by pultrusion as described by Edwards et al. to form the synthetic reinforcement of the desired length, width, thickness, and shape.

The preferred class of polymers for the fiber-reinforced composite are depolymerizable and repolymerizable polymers (DRTPs) having the following structural units:

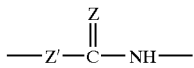

where Z is S or O, preferably O, and Z' is S, O, N-alkyl or NH, preferably O or NH, most preferably O. As used herein, the term depolymerizable and repolymerizable refers to a polymer the undergoes some degree of molecular weight reduction upon application of a sufficient amount of heat, and some degree of molecular weight rebuilding when the polymer is cooled.

The reinforcing fibers are not critical to the practice of the present invention and may include glass, carbon, aramid fibers, ceramic, and various metals. The DRTP is a single- or two-phase polymer that can be prepared by the reaction of: a) a diisocyanate or a diisothiocyanate, preferably a diisocyanate; b) a low molecular weight compound (not more than 300 Daltons) having two active hydrogen groups; and c) optionally a high molecular weight compound (molecular weight in the range of from about 500 to about 8000 Daltons) with two active hydrogen groups. The low molecular weight compound, in combination with the diisocyanate or diisothiocyanate group, contributes to what is known as the "hard segment" content. Similarly, the high molecular weight compound, in combination with the diisocyanate or diisothiocyanate group, contributes to what is known as the "soft segment" content. Either a stoichiometric amount or a stoichiometric excess of the diisocyanate can be reacted with the low molecular weight compound and optionally the high molecular weight compound. Preferred DRTPs are thermoplastic polyurethanes and thermoplastic polyureas, preferably thermoplastic polyurethanes.

As used herein, the term "active hydrogen group" refers to a group that reacts with an isocyanate or isothiocyanate group as shown:

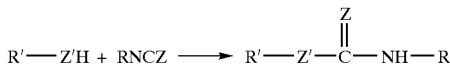

where Z and Z' are previously defined, and R and R' are connecting groups, which may be aliphatic, aromatic, or cycloaliphatic, or combinations thereof. Examples of, compounds with two active hydrogen groups include diols, diamine, dithiols, hydroxyamines, thiolamines, or hydroxythiols. Preferred compounds with two active hydrogen groups are diols.

A preferred class of thermoplastic polyurethanes is polyurethane engineering thermoplastic resins, also known as rigid thermoplastic polyurethanes (RTPUs). RTPUs are characterized by having a glass transition temperature ($T_g$) of not less than 50° C. RTPUs preferably have a hard segment not less than about 75 percent by weight, more preferably not less than 90 percent by weight, to about 100 percent by weight, based on the weight of the RTPU. The disclosure and preparation of polyurethane engineering thermoplastic resins is described, for example, in Goldwasser et al. in U.S. Pat. No. 4,376,834, and Oriani in U.S. Pat. No. 5,627,254, which teachings are incorporated herein by reference. Such resins are commercially available under the trade name ISOPLAST™ engineering thermoplastic polyurethanes (a trademark of The Dow Chemical Company).

Another preferred class of thermoplastic polyurethanes is soft thermoplastic polyurethane resins (STPUs). STPUs are characterized by having a $T_g$ of less than 25° C. Preferably, the STPU has a hard segment of not less than 15 and not more than 50 weight percent, and a soft segment of not more than 85, and not less than 50 weight percent, based on the weight of the STPU. STPUs are commercially available under the trade name PELLETHANE™ resins. It is to be understood that blends of STPUs and RTPUs can also be used as a resin for the fiber-reinforced thermoplastic composite.

Processes for the manufacture of glue-laminated structural wood members, LVL, I-joists and PSL are well known in the art. See, for example, U.S. Pat. No. 5,4556,781, column 3, lines 27–49, incorporated herein by reference. The conventional processes can be modified to incorporate synthetic tension reinforcement or synthetic compression reinforcement or both.

One of the advantages of using pultruded fiber-reinforced composites made using thermoplastic polyurethanes is that the formation of diisocyanates in the depolymerization process provides a mechanism for adhesion to wood without surface modification of the wood laminae, without the use of an ancillary adhesive, and without modification of the surface of the fiber-reinforced composite. This natural ability of the composite to adhere to wood is due presumably to the presence of active hydrogens in the wood. Thus, the thermoplastic composite part can be bonded to wood, or affixed between two lamina to provide synthetic tension or compression reinforcement or both by heat bonding the part to the surfaces of the wood laminae. An alternative or additional explanation for the propensity of the thermoplastic matrix to bond to the wood is that under melt producing conditions, the matrix can flow into the cracks and pores of the wood, thereby producing mechanical bonding.

Nevertheless, it may be desirable and preferable in some instances to use an ancillary adhesive such as those generally used in the wood industry, for example, phenol formaldehyde, phenol resorcinol formaldehyde, or MDI, to promote adhesion between the wood laminae and the thermoplastic composite part. Generally, the amount of adhesive required is less than the amount required for typical matrix resins due to the natural tendency of the thermoplastic polyurethane to chemically and/or mechanically bond to wood.

Alternatively, or additionally, it may be desirable to react the compound or compounds having two active hydrogen groups with a stoichiometric excess of the diisocyanate or diisothiocyanate to create an "overindexed" DRTP, which more readily reacts with the active hydrogens in the wood.

The reinforced lumber of the present invention shows surprising advantages in hygrothermal cycling due to perpendicular compliance, and improved toughness for handling in lamination mills due to the unique nature of the resin used to make the fiber-reinforced thermoplastic composite. This composite does not produce undesirable VOCs during manufacture, and it can be prepared at rapid line speeds as compared to the pultruded composites that do not use these unique resins. Furthermore, the depolymerizable/repolymerizable nature of the engineering thermoplastic polyurethane resin provides extremely high modulus composites (greater than 40 GPa) as compared to other fiber-reinforced thermoplastic composites, thus resulting in superior reinforcement of the wood. Moreover, the thermoplastic nature of the composite provides an avenue for the shaping of and hammering nails into the composite, which are not possible using fiber-reinforced thermoset composites due to their brittleness. Finally, the unique nature of this composite provides a means to recycle and reuse the reinforced lumber, which is not possible using conventional fiber-reinforced thermoset or thermoplastic composites.

What is claimed is:

1. A reinforced wood structure comprising at least one elongated fiber-reinforced thermoplastic composite rod embedded into at least one wood member.

2. The reinforced wood structure of claim 1 wherein one wood member has a plurality of slots or bores and a plurality of elongated fiber-reinforced thermoplastic composite rods embedded into slots or bores along the grain of the wood member.

3. The reinforced wood structure of claim 2 wherein the thermoplastic polymer is an engineering thermoplastic polyurethane having a Tg of not less than 50° C.

4. The reinforced wood structure of claim 1 which is elongated and multilamellar, wherein the rods are disposed through the multilamellar structure in a zig-zag fashion across the grain of the lamellae and through the length of the wood structure.

5. The reinforced wood structure of claim 1 wherein the composite rods contain a thermoplastic polymer having the following structural units:

where Z is S or O, and Z' is S, O, N-alkyl or NH.

6. A reinforced wood structure comprising an elongated multilamellar wood member having a longitudinal center, a transverse center, a width center, and a plurality of elongated fiber-reinforced thermoplastic composite rods, at least two of which rods are tension reinforcement rods and at least two of which rods are compression reinforcement rods, wherein the tension reinforcement rods are disposed through the longitudinal center, and distal on either side of the width center and imbedded into and adhering to a lamina distal from the transverse center and proximal to the lowermost lamina of the multilamellar structure, and wherein the compression reinforcement rods are disposed through the longitudinal center, and distal from either side of the width center and imbedded into and adhering to a lamina distal from the transverse center and proximal to the uppermost lamina of the multilamellar structure.

7. The reinforced wood structure of claim 6 wherein the composite rods contain a thermoplastic polymer having the following structural units:

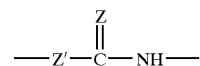

where Z is S or O, and Z' is S, O, N-alkyl or NH.

8. The reinforced wood structure of claim 7 wherein the thermoplastic polymer is an engineering thermoplastic polyurethane having a Tg of not less than 50° C.

9. The reinforced wood structure of claim 8 wherein the lowermost lamina and the uppermost lamina each have slots or bores, and the tension reinforcement rods are imbedded into and adhering to the slots or bores of the lowermost lamina, and the compression reinforcement rods are imbedded into and adhering to the slots or bores of the uppermost lamina.

10. The reinforced wood structure of claim 8 wherein the tension and compression reinforcement rods do not extend through the length of the structure.

11. The reinforced wood structure of claim 8 wherein the tension and compression reinforcement rods extend through the length of the structure.

* * * * *